TELEPHONE CLAMPS

Filed Aug. 21, 1961

INVENTOR.
FRED NIMER
BY
Gerald E. Bramblett Jr.
ATTORNEY.

United States Patent Office 3,069,513

Patented Dec. 18, 1962

3,069,513

TELEPHONE CLAMPS

Fred Nimer, 7 Bayberry Lane, Danbury, Conn.

Filed Aug. 21, 1961, Ser. No. 132,719

5 Claims. (Cl. 179—189)

This invention relates to a telephone clamp and, more particularly, to a childproof clamp for French-style telephones.

One difficulty experienced by nearly all parents is that of the fascination a telephone holds for a young child. This leads to many problems, not the least of which is the fact that a telephone may be left disconnected for long periods and thus be unable to receive incoming calls. Furthermore, where a home has more than one telephone, conversations may be interrupted by a child on a different phone. Finally, with the advent of long-distance direct-dialing, there is always the danger that a child may inadvertently dial a distant number—a fact which may not be discovered until receipt of the month's bill.

Attempts have been made to solve these problems in the past, but the solutions have been imperfect. Prior art devices were generally subject to either of two failings. Either the clamp was too complex, being difficult to remove by an adult, or it was too simple and the child soon learned to inactivate it. An example of the first type is the locking mechanism using a key lock. An example of the second is the same spring latch, disengageable by suitable pressure. Another disadvantage of many prior art devices is the fact that they must be entirely removed from the phone. Not only is this an annoyance, but they must be carefully replaced after each use and the user may neglect to do this.

It is, therefore, the primary object of this invention to provide an improved telephone clamp.

Another object is to provide such a clamp easily disengageable by an adult.

Another object is to provide such a clamp which is difficult for a child to disengage.

Another object is to provide a clamp which need not be removed to use the phone.

Another object is to provide a clamp which engages automatically upon replacing the handset.

The above objects are achieved by the clamp of this invention which remains attached to the telephone but is disengageable by a two-part hand movement, simple for an adult, but difficult for a small child to achieve.

In accordance with this invention, a device is provided which comprises a body member attachable to the base of a French-type telephone. A plunger-depressing arm is resiliently positioned between the telephone plunger and hand set so that the weight of the handset will depress the arm against the plunger. When the handset is lifted, the arm is resiliently urged away from the plunger. The arm carries a first latching member. A second latching member is attached to the body member and engages the first latching member to hold the arm depressed. The latch may be manually disengaged upon further depression of the arm.

The construction of the apparatus of this invention will be more apparent from the following description, the appended claims, and the figures of the attached drawing wherein:

Figures 1, 4:
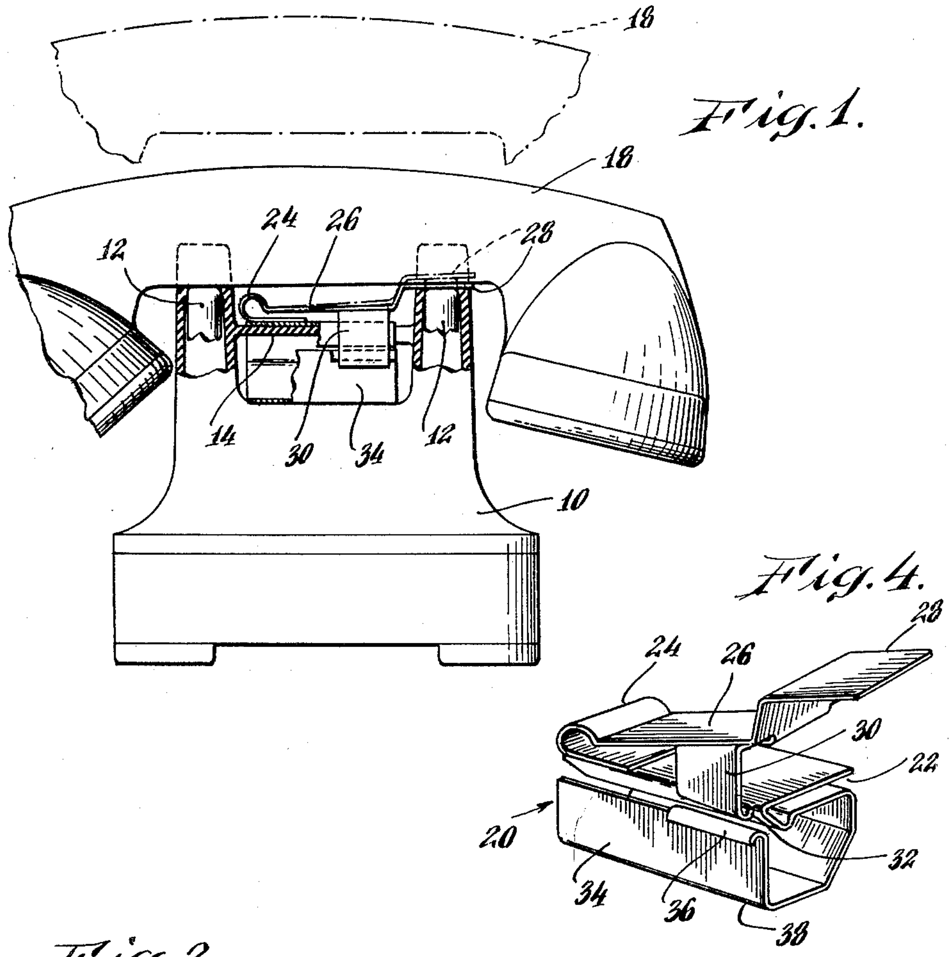
FIG. 1 is an elevational view of a telephone, partially cut-away, with the clamp of the invention in place.
FIG. 4 is a perspective view of the clamp of this invention.

In the illustrations, there is shown a telephone having a base 10, a pair of operating plungers 12, a shelf 14, a finger slot 16, and a handset 18. The clamp 20 is a unitary member which may be constructed of any suitably resilient sheet material such as metal or plastic. The main body is of a roughly S-shaped configuration, forming a slot 22 which fits over the shelf 14. Attached to the upper side of clamp 20 is a spring portion 24 supporting an actuating arm 26 which is suitably bent to form a tab 28 which is aligned with one of plungers 12. Depending from arm 26 is a first latch member 30 terminating in a first hook 32. The lower portion of clamp 20 carries an upwardly extending second latch member 34 which carries a second hook 36. The clamp is so designed that latch member 34 is resiliently movable about corner 38.

In operation, the clamp is attached to a telephone base by simply sliding slat 22 onto shelf 14 while the handset 18 is removed. The clamp is in the unlatched position shown in FIG. 4 and, thus, tab 28 is out of contact with plunger 12. The hand set 18 is then replaced. The weight of the handset depresses tab 28, arm 26, latch member 30, and first hook 32 against the action of spring 34. Hook 32 slides over and past second hook 36.

Figure 2:
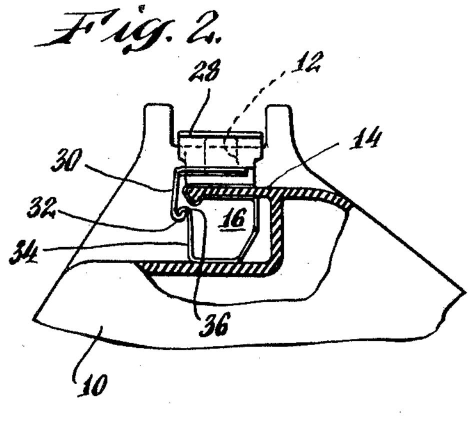
FIG. 2 is a cross-sectional elevation of a portion of a telephone base showing the clamp in the locked position.

If, now, the handset is lifted as shown in FIG. 1, spring 24 will exert a lifting force on arm 26. The hooks, however, will now engage as shown in FIG. 2, keeping tab 28 and its abutting plunger 12 depressed far enough to keep the phone disconnected.

Figure 3:
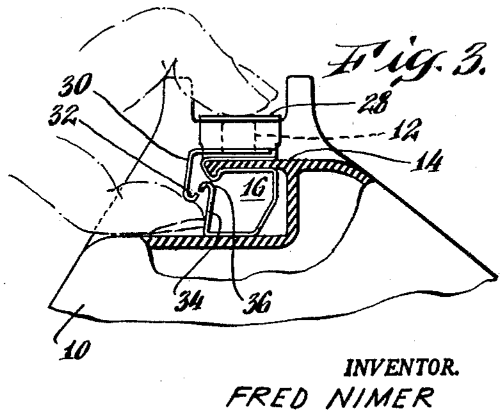
FIG. 3 is a view similar to that of FIG. 2 illustrating the two-step procedure required to disengage the clamp.

To inactivate the clamp so as to use the phone, arm 26 or tab 28 must be manually depressed as shown in FIG. 3. This operation causes hooks 32 and 36 to disengage vertically. Lateral disengagement is then provided by sidewise pressure against latch member 34, as shown in FIG. 3. Tab 28 is then released, the hooks spring apart vertically, and the telephone is ready for use.

While the motions required to release the clamp of this invention are quite simple for an adult, they are difficult for a small child. It will thus be apparent that the device of this invention is highly effective as a childproof latching device.

It will also be apparent that a number of modifications may be made in this invention without departing from the spirit thereof. The clamp may be made from any suitable material or from a combination of materials. The clamp may be a unitary element suitably cut and bent or it may be constructed of various members properly welded, cemented, or otherwise secured to one another. Various other modifications will be apparent to those skilled in the art. The invention is intended to be limited only by the scope of the following claims.

I claim:

1. A telephone clamp for a telephone having a base member, at least one operating plunger extending from said base member, and a handset adapted to rest upon said plunger when not in use, said clamp comprising:

a body member attachable to said base member;

plunger depressing arm means in intervening relationship between said plunger and said handset;

resilient means interconnecting each of said arm means and said body member to urge said arm means away from said plunger but yieldable to depress said plunger under the weight of said handset;

a first latch means on said arm means; and second latch means on said body member engageable with said first latch means when said arm means is in depressing relationship to said plunger but manually disengageable therefore upon further depression of said arm means.

2. The apparatus of claim 1 wherein said first and second latch means are hook means.

3. A telephone clamp for a telephone having a base member, at least one operating plunger extending from said base member, and a handset adapted to rest upon said plunger when not in use, said clamp comprising:

a body member attachable to said base member;

vertically movable plunger depressing arm means in intervening relationship between said plunger and said handset;

spring means interconnecting each of said arm means and said body member to urge said arm means away from said plunger but yieldable to depress said plunger under the weight of said handset;

a first latch means on said arm means; and second latch means on said body member engageable with said first latch means when said arm means is in depressing relationship to said plunger but resiliently movable transverse to the direction of motion of said first latch means for manual disengagement therefrom.

4. A telephone clamp for a telephone having a base member, a finger-gripping shelf, at least one operating plunger mounted for vertical movement in said base member, and a handset adapted to rest upon said plunger when not in use, said clamp comprising:

a clip member attachable to said shelf;

vertically movable plunger depressing arm means in intervening relationship between said plunger and said handset;

spring means interconnecting said arm means and said clip member in actuating relationship therebetween to urge said arm means away from said plunger but yieldable to depress said plunger under the weight of said handset;

a first hook means on said arm means; and second hook means on said clip member engageable with said first hook means when said arm means is in depressing relationship to said plunger but resiliently movable transverse to the direction of motion of said first latch means for manual disengagement therefrom.

5. A clamp for a desk-type telephone having a base portion including a finger-gripping shelf and an operating plunger comprising:

an elongated body member formed from a sheet of relatively resilient material and having a substantially S-shaped cross-section, a first arm of said S being adapted to lie along said shelf, the adjacent opening being adapted to engage said shelf, the second arm of said S terminating in a first hook;

a second hook depending from said first arm in engaging relationship with said first hook; and a plunger-depressing member integral with said first arm in actuating relationship with said plunger.

No references cited.